United States Patent
Dhuse

(10) Patent No.: US 8,621,268 B2
(45) Date of Patent: Dec. 31, 2013

(54) WRITE THRESHOLD UTILIZATION IN A DISPERSED STORAGE SYSTEM

(75) Inventor: Greg Dhuse, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 529 days.

(21) Appl. No.: 12/862,871

(22) Filed: Aug. 25, 2010

(65) Prior Publication Data

US 2011/0126042 A1    May 26, 2011

Related U.S. Application Data

(60) Provisional application No. 61/264,516, filed on Nov. 25, 2009.

(51) Int. Cl.
*G06F 11/00* (2006.01)

(52) U.S. Cl.
USPC .......................................................... 714/6.2

(58) Field of Classification Search
USPC ............................ 714/48, 5.11, 6.2; 711/114
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Yair Leibovich
(74) *Attorney, Agent, or Firm* — Garlick & Markison; Timothy W. Markison

(57) ABSTRACT

A method begins with a processing module sending a plurality of dispersed storage write commands to plurality of dispersed storage (DS) units for storing a plurality of encoded data slices. The method continues with the processing module receiving, within a time period, acknowledgements from at least some of the plurality of DS units to produce received acknowledgements. The method continues with the processing module determining whether a number of received acknowledgements compares favorably to a write threshold. The method continues with the processing module changing at least one of the write threshold and at least one of the plurality of DS units when the number of received acknowledgements does not compare favorably to the write threshold.

16 Claims, 8 Drawing Sheets

(56) References Cited

U.S. PATENT DOCUMENTS

| | | |
|---|---|---|
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1* | 4/2007 | Gladwin et al. ............... 711/154 |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2008/0288646 A1* | 11/2008 | Hasha et al. ............... 709/228 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0029731 A1* | 2/2011 | Cilfone et al. ............... 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

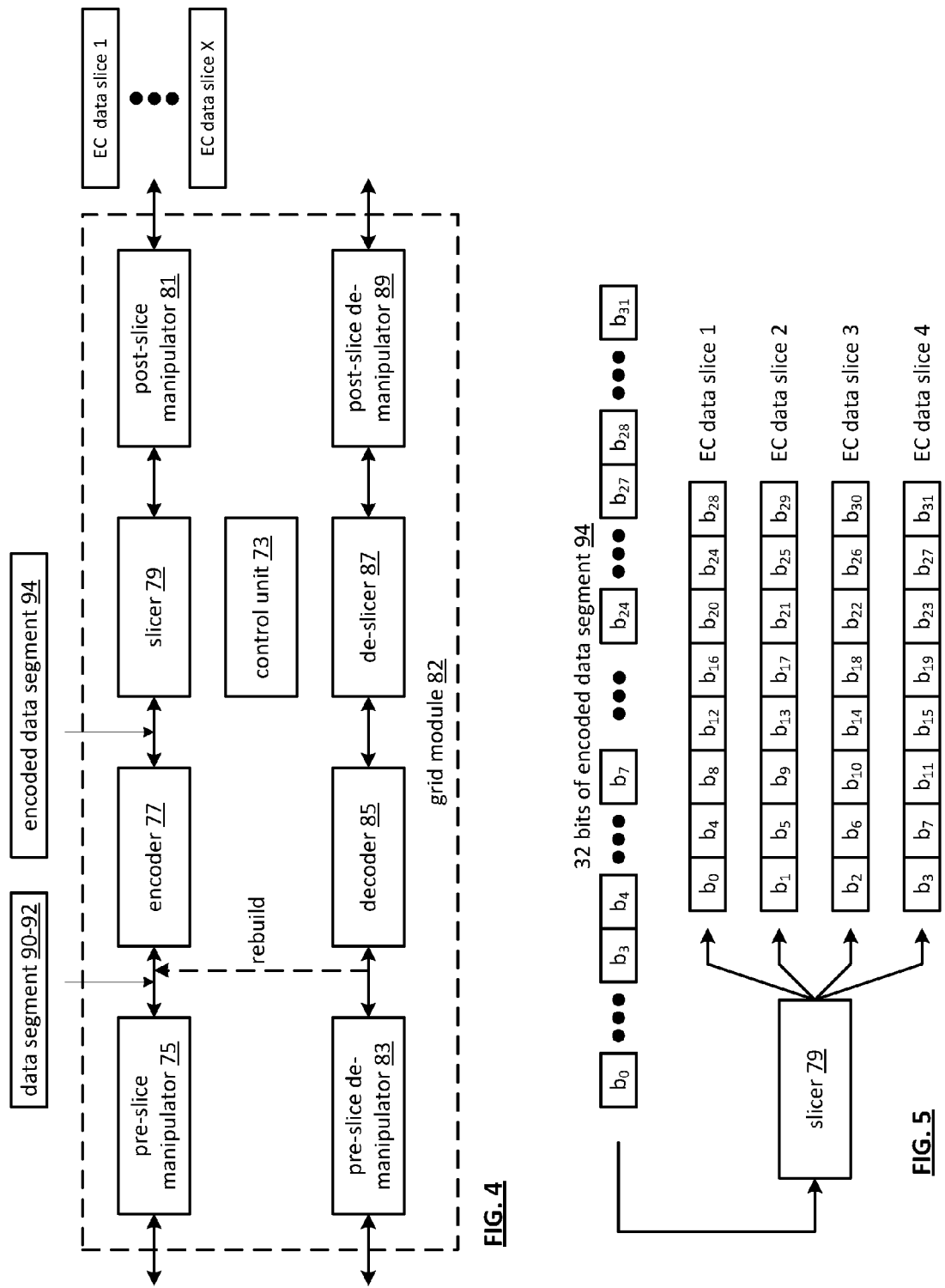

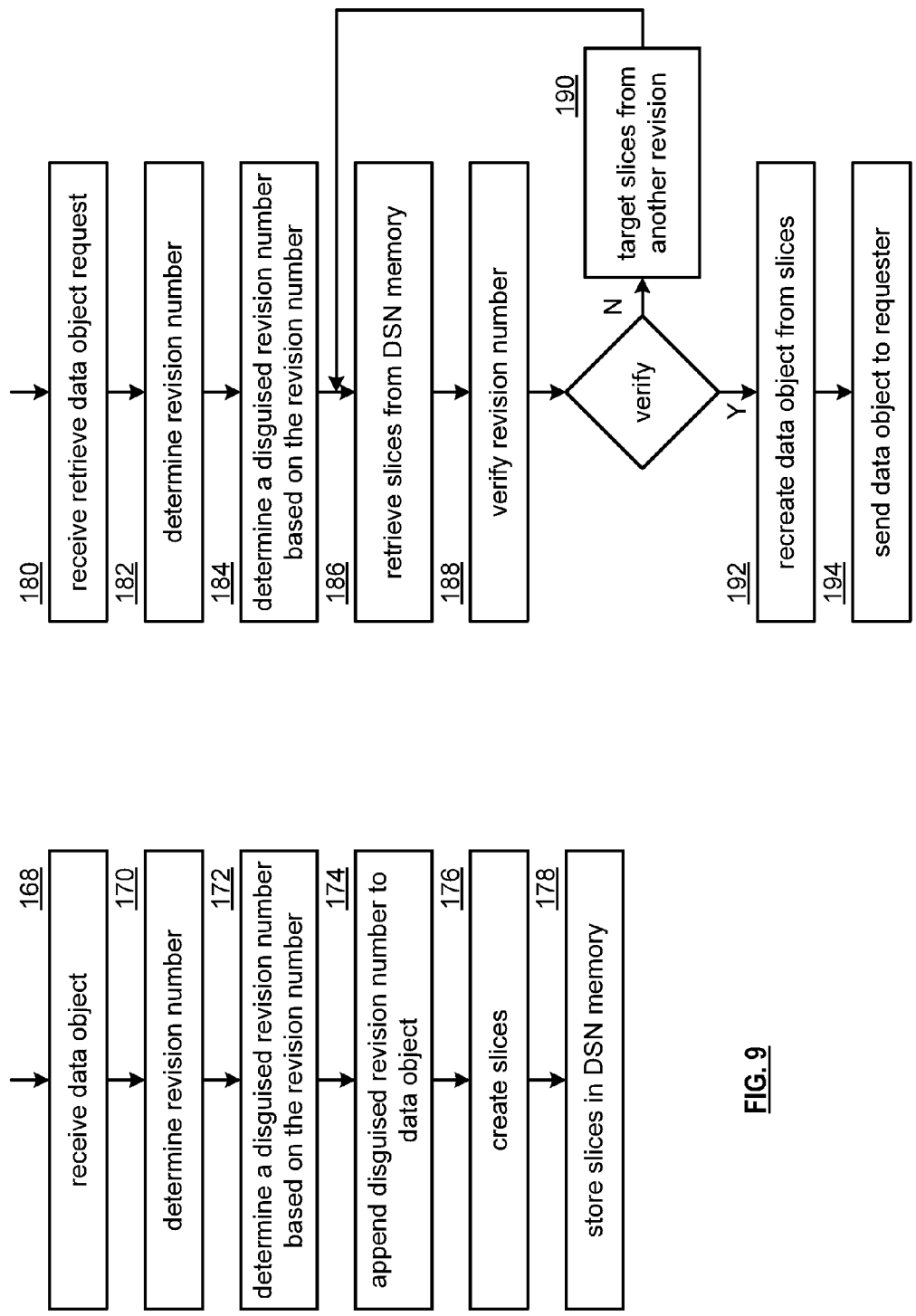

WRITE THRESHOLD UTILIZATION IN A DISPERSED STORAGE SYSTEM

CROSS REFERENCE TO RELATED PATENTS

The present U.S. Utility Patent Application claims priority pursuant to 35 U.S.C. §119(e) to U.S. Provisional Application Ser. No. 61/264,516, entitled "STORING DATA IN A DISTRIBUTED STORAGE NETWORK,", filed Nov. 25, 2009, pending, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming. etc.).

Each type of computer operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 9 is a flowchart illustrating an example of disguising a revision number in accordance with the invention; and FIG. 10 is a flowchart illustrating an example of retrieving data utilizing a disguised revision number in accordance with the invention.

DETAILED DESCRIPTION OF THE INVENTION

Figure 1:
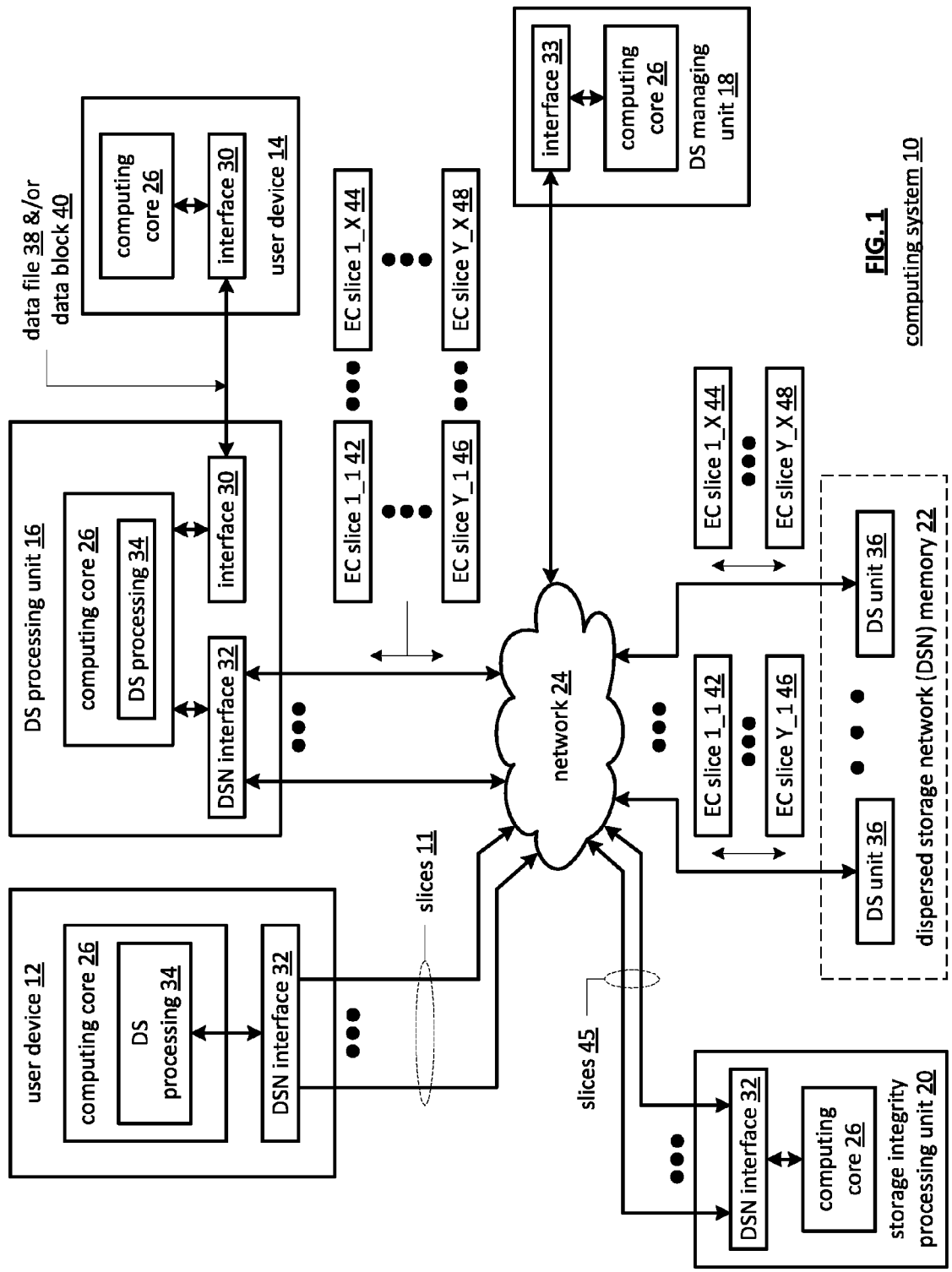
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-10.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-10.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
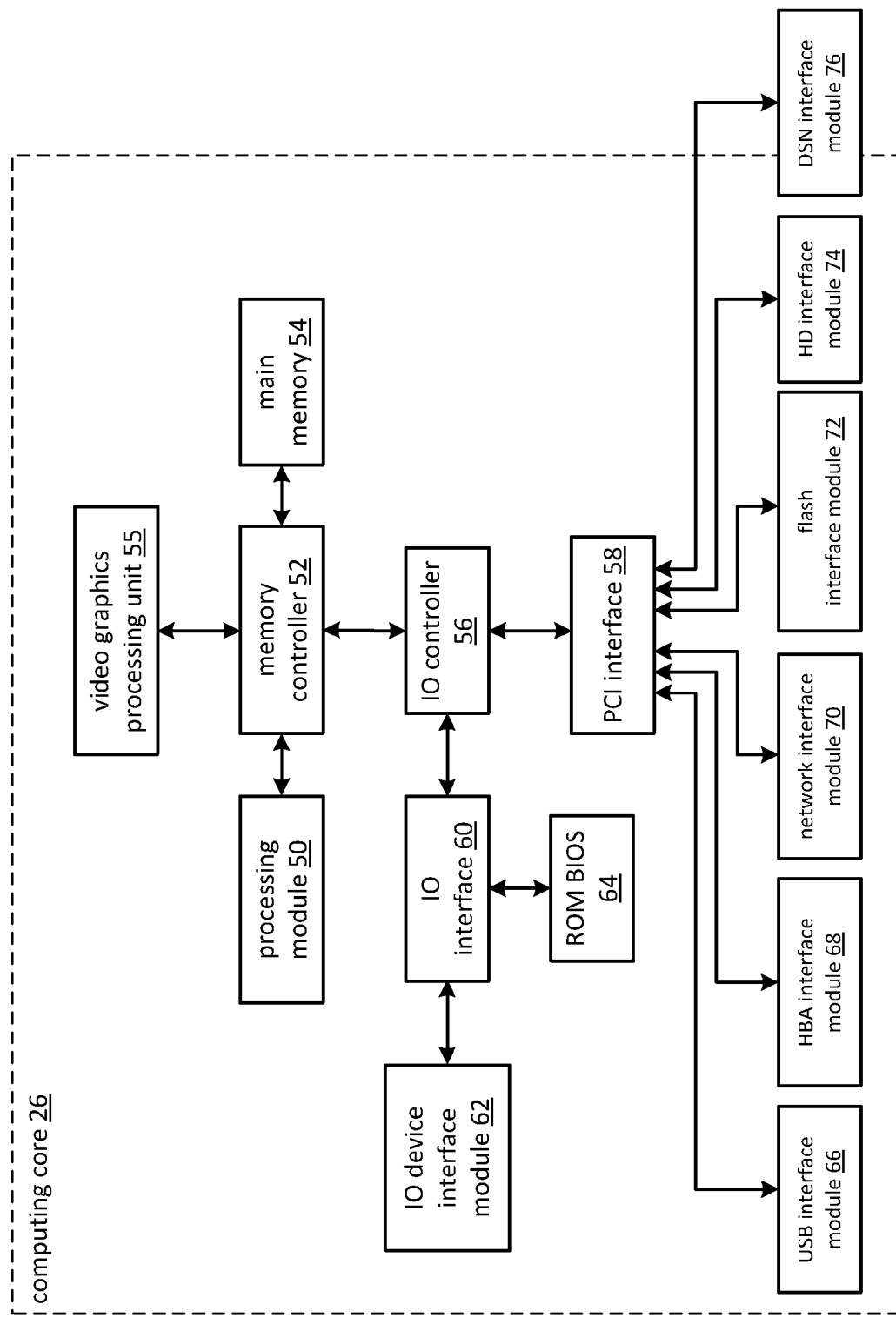
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-10.

Figure 3:
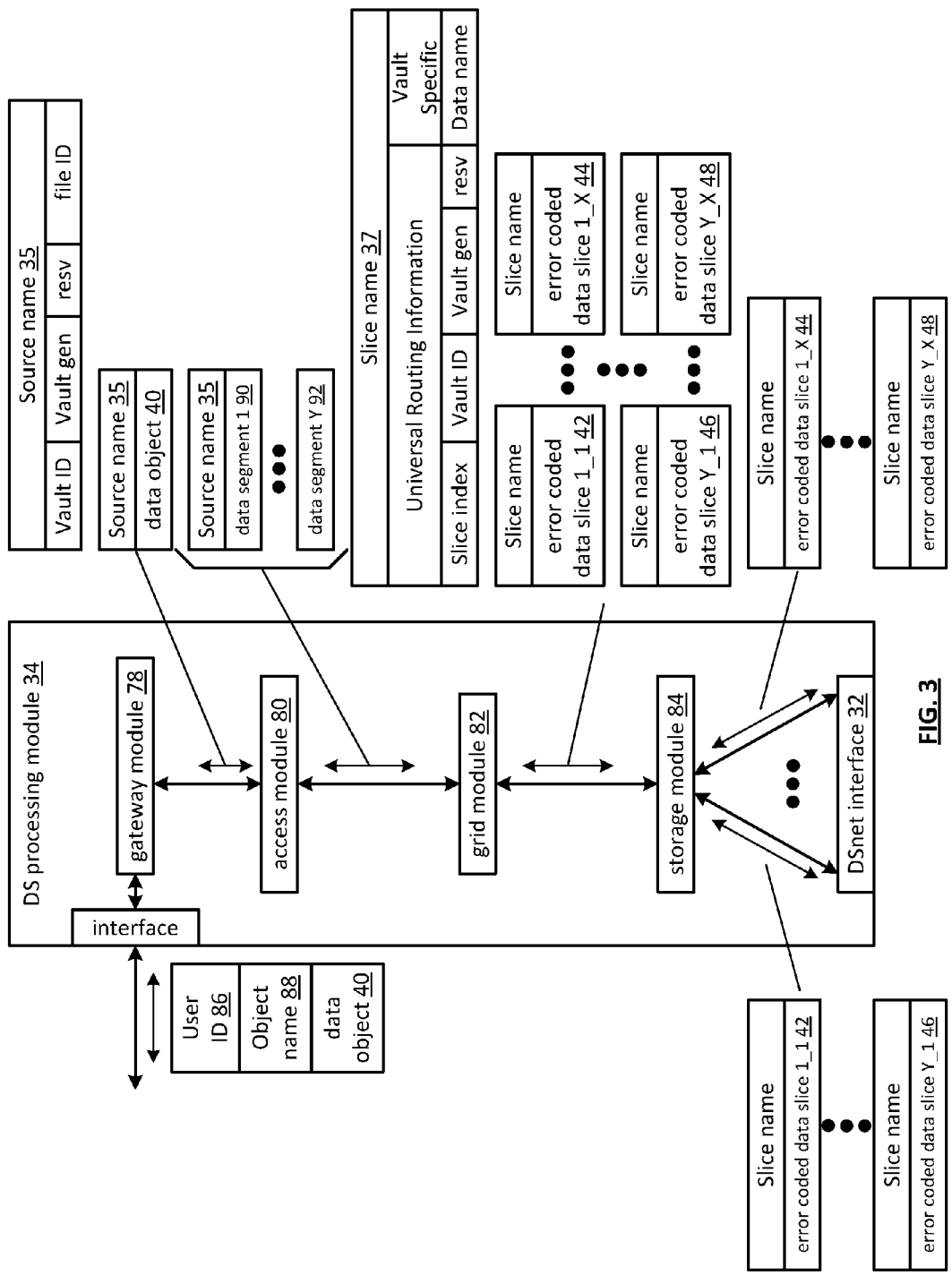
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
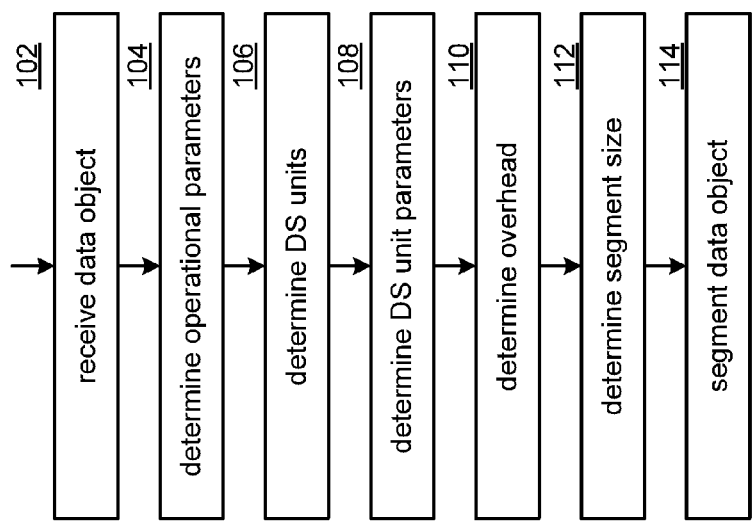
FIG. 6 is a flowchart illustrating an example of determining data segment size in accordance with the invention.

FIG. 6 is a flowchart illustrating an example of determining data segment size. The method begins at step 102 where a DS processing (e.g., a processing module of an access module of a DS processing) receives a data object (e.g., from a user device or other source). In addition, the DS processing may receive one or more of a data object name, a data object size indicator, a user ID, a data type, a security indicator, a performance indicator, a priority indicator, and a reliability indicator with the received data object.

At step 104, the DS processing determines operational parameters that may include a compression type, a checksum algorithm type, a coding algorithm type, a slicing method type, a slicing pillar width, a right threshold, and/or a read threshold. Such a determination is based on one or more of a predetermination, a command, a vault lookup, the data object name, the user ID, the data type, the security indicator, the performance indicator, the priority indicator, and the reliability indicator.

At step 106, the DS processing determines DS units to store data slices based on one or more of a virtual DSN address to physical location table lookup, a predetermination, a command, a vault lookup, the data object name, the user ID, the data type, the security indicator, the performance indicator, the priority indicator, and the reliability indicator. At step 108, the DS processing determines DS unit parameters including the block memory size (e.g., 512 bytes, 1,024 bytes, or more) and the amount of overhead the DS unit appends to the slice when stored together (e.g., checksum, markers, addressing, etc.). Such a determination may be based on one or more of a query of the DS units, a predetermination, a command, and a vault lookup.

At step 110, the DS processing determines total overhead of the expected transformation of the data segment into slices which may include one or more of overhead appended to the data segment, coding and slicing of the data segment, and overhead appended by the DS unit to the slice prior to storage. Such a determination may be based on one or more of the operational parameters, the DS unit parameters, a predetermination, a command, a vault lookup, and/or any other attribute that affects the expected transformation. For example, the DS processing adds a 32 bytes CRC to the data segment, the data segment expands by a ratio of 16/10 for a pillar width n=16 read threshold k=10 coding method, the slice size is 1/16 of the coded data segment for the 16/10 coding method, and the DS unit appends a 16 byte CRC to the slice for storage. In this example, the slice size SS can be written as a function of the data segment size DSS as: SS=(DSS+32)(16/10)(1/16)+16. The formula can be rearranged to express data segment size as a function of a multiple M of block size (slice size) as: DSS=(10/16)(16/1)((M*block size)−16)−32.

The method continues at step 112 where the DS processing determines the data segment size based on one or more of the total overhead, the data object size indicator, the operational parameters, the DS unit parameters, a predetermination, a command, a configuration, a formula, and a vault lookup. In an example, the formula of the 16/10 dispersal system is DSS=(10/16)(16/1)((M*block size)−16)−32, M=1, block size=1,024, the data object size indicator is 1 megabytes, then 100 data segments that are 10,048 bytes each may be utilized. Note that 99 of the 100 data segments will produce 1,024 bytes slices that are fully utilized and exactly fit the 1,024 byte data block size to facilitate improved write and read efficiency. Note that the 100$^{th}$ data segment (e.g., 10,048 bytes) includes the last 5,248 bytes of the data object and may include 4,800 bytes of pad (e.g., zeroes or ones or some combination).

In another example, the DS processing determines the multiple M of data blocks such that the slice fits evenly in two or more data blocks to achieve a secondary objective (e.g., minimizing the number of pad bytes stored). For example, the formula of the 16/10 dispersal system is DSS=(10/16)(16/1)((M*block size)−16)−32, block size=1,024, the data object size indicator is 1 megabytes, then the DS processing may choose 14 data segments that are 71,488 bytes each. Note that 13 of the 14 data segments will produce 7,168 bytes slices that are fully utilized and exactly fit seven of the 1,024 byte data blocks to facilitate improved write and read efficiency. Note that the 14$^{th}$ data segment (e.g., 71,488 bytes) includes the last 70,656 bytes of the data object and may include just 832 bytes of pad (e.g., zeroes or ones or some combination).

At step 114, the DS processing segments the data object in accordance with the data segment size to produce a plurality of data segments. The DS processing encodes each of the plurality of data segments in accordance with an error code in dispersal storage function and the operational parameters to produce a plurality of sets of encoded data slices. Next, the DS processing sends the plurality of sets of encoded data slices with a store command to the plurality of DS units for further processing and therein.

Data segment size may affect the efficiency of a DS unit memory based on whether the resulting data slices fit within multiples of the memory data block size. For example, a DS unit disk drive memory has a memory data block size of 1,024 bytes. The DS processing determines the data segment size to use an integer number of DS unit disk drive memory data blocks based on the expected transformation of the data segment into slices. The expected transformation accounts for the coding process (e.g., addition of bytes to the data segment), the slicing process (e.g., which divides the coded data segment), and any other manipulations, which change the size of the resulting stored slices (e.g., error checking, error coding).

Figure 7:
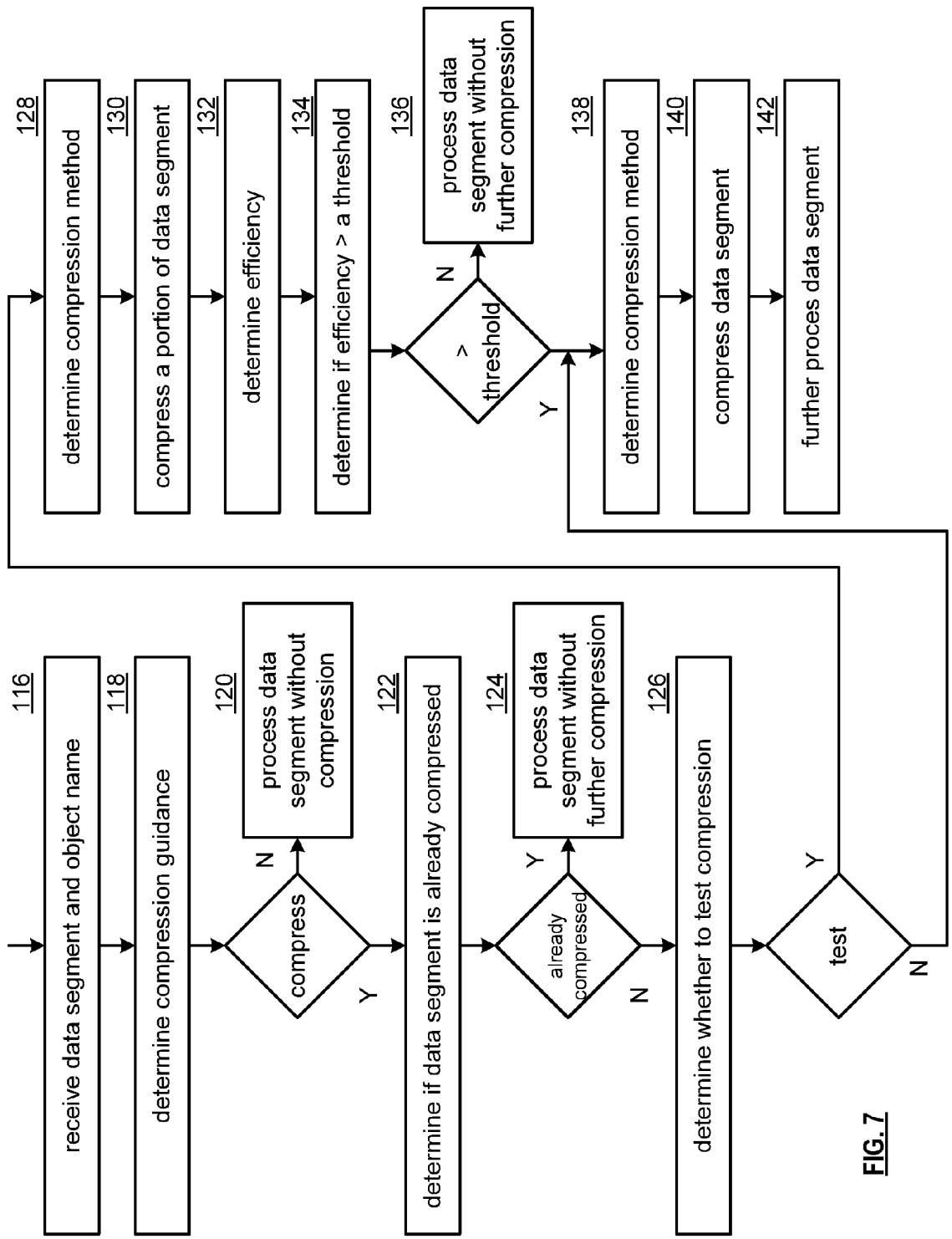
FIG. 7 is a flowchart illustrating an example of determining compression in accordance with the invention.

FIG. 7 is a flowchart illustrating an example of determining compression. The method begins at step 116 where a processing module (e.g., of a grid module of a DS processing) receives a data segment and data object name (e.g., from an access module and/or gateway module). In addition, the processing module may receive one or more of a data object size indicator, a user ID, a data type, a security indicator, a performance indicator, a priority indicator, and/or a reliability indicator with the received data segment.

At step 118, the processing module determines compression guidance which may include one or more of don't compress, mandatory compress, compress if compressible, by data type, and based on a user ID. Such a determination may be based on one or more of a vault lookup, the data object size indicator, the user ID, a data type, the security indicator, the performance indicator, the priority indicator, and the reliability indicator. For example, the processing module determines to mandatorily compress the data segment when the data type is a text file and the user ID is 1,457. In another example, the processing module determines to "compress if compressible" when the data object size indicator is greater than a threshold. In another example, the processing module determines to not compress when the user ID is 4,739.

The method branches to step 122 when the processing module determines the compression guidance to be "to compress". The method continues to step 120 when the processing module determines the compression guidance to be "not to compress". At step 120, the processing module processes the data segment without compression (e.g., encode, slice, send slices to DSN memory).

At step 122, the processing module determines whether the data segment is already compressed based on one or more of the data object name, the data type, a vault lookup, the data object size indicator, the user ID, the security indicator, the performance indicator, the priority indicator, a flag, and the reliability indicator. For example, the processing module determines that the data segment is already compressed when the data object name or data type indicates a compressed file (e.g., .zip, .jpeg, .mp3, etc.).

The method continues to step 124 when the processing module determines that the data segment is already compressed. At step 124, the processing module processes the data segment without further compression (e.g., encode, slice, send slices to DSN memory). The method branches to step 126 when the processing module determines that the data segment is not already compressed.

At step 126, the processing module determines whether to test compression based on one or more of the data object name, the data type, a vault lookup, the data object size indicator, the user ID, the security indicator, the performance indicator, the priority indicator, a flag, and the reliability indicator. For example, the processing module determines to test compression when the data object size indicator is greater than a threshold such that a final determination to compress the entire data segment can be made based on the test results. As a specific example, the processing module determines that full compression on such a large data segment may not yield favorable results so skip the full compression.

In another example, the processing module determines to not test compression when the data object size indicator is less than a compression threshold such that the full compression may be executed next. In a specific example, the processing module determines that full compression on such a small data segment will not take much processing resources so it decides to compress it. The method branches to step 138 when the processing module determines not to test compression. The method continues step 128 when the processing module determines to test compression.

At step 128, the processing module determines the compression method (e.g., Lempel-Ziv-Welch, Huffman, Golomb, fractal, JPEG, wavelet, etc.), based on one or more of the data object name, the data type, a vault lookup, the data object size indicator, the user ID, the security indicator, the performance indicator, the priority indicator, a flag, and the reliability indicator. For example, the processing module determines the compression method to be the fractal method when the data type is video.

At step 130, the processing module compresses a portion of the data segment in accordance with the compression method. The size of the portion is based on one or more of the compression method, the size of the data segment, the amount of data required for the compression method to obtain reliable test results, a predetermination, a vault lookup, and a command. For example, the processing module determines the portion size to be 50 kilobytes of the data segment when the compression method is fractal.

At step 132, the processing module determines an efficiency of the compression method, which may be made by dividing the size of the compressed portion by a size of the uncompressed portion. For example, the processing module determines the efficiency to be a 20% reduction when the size of the compressed portion divided by the size of the uncompressed portion is 0.8.

At step 134, the processing module determines whether the efficiency is greater than an efficiency threshold to determine whether to fully compress the data segment. The method continues to step 136 when the processing module determines that the efficiency is not greater than a threshold. At step 136, the processing module processes the data segment without further compression (e.g., encode, slice, send slices to DSN memory). Alternatively, or in addition to, the processing module branches back to step 128 to determine a different compression method to retest. That next determination at step 128 may further be based on the results of the present compression method. The method branches to step 138 when the processing module determines that the efficiency is greater than a threshold.

At step 138, the processing module determines the compression method (e.g., Lempel-Ziv-Welch, Huffman, Golomb, fractal, JPEG, wavelet, etc.), based on one or more of the data object name, the data type, a vault lookup, the data object size indicator, the user ID, the security indicator, the performance indicator, the priority indicator, a flag, and the reliability indicator. For example, the processing module may determine the compression method to be the fractal method when the data type is video.

At step 140, the processing module compresses the data segment in accordance with the compression method. In addition, the processing module may save the compression method in a vault and/or append it to the data segment. At step 142, the processing module further processes the data segment (e.g., encode, slice, send slices to DSN memory).

Figure 8:
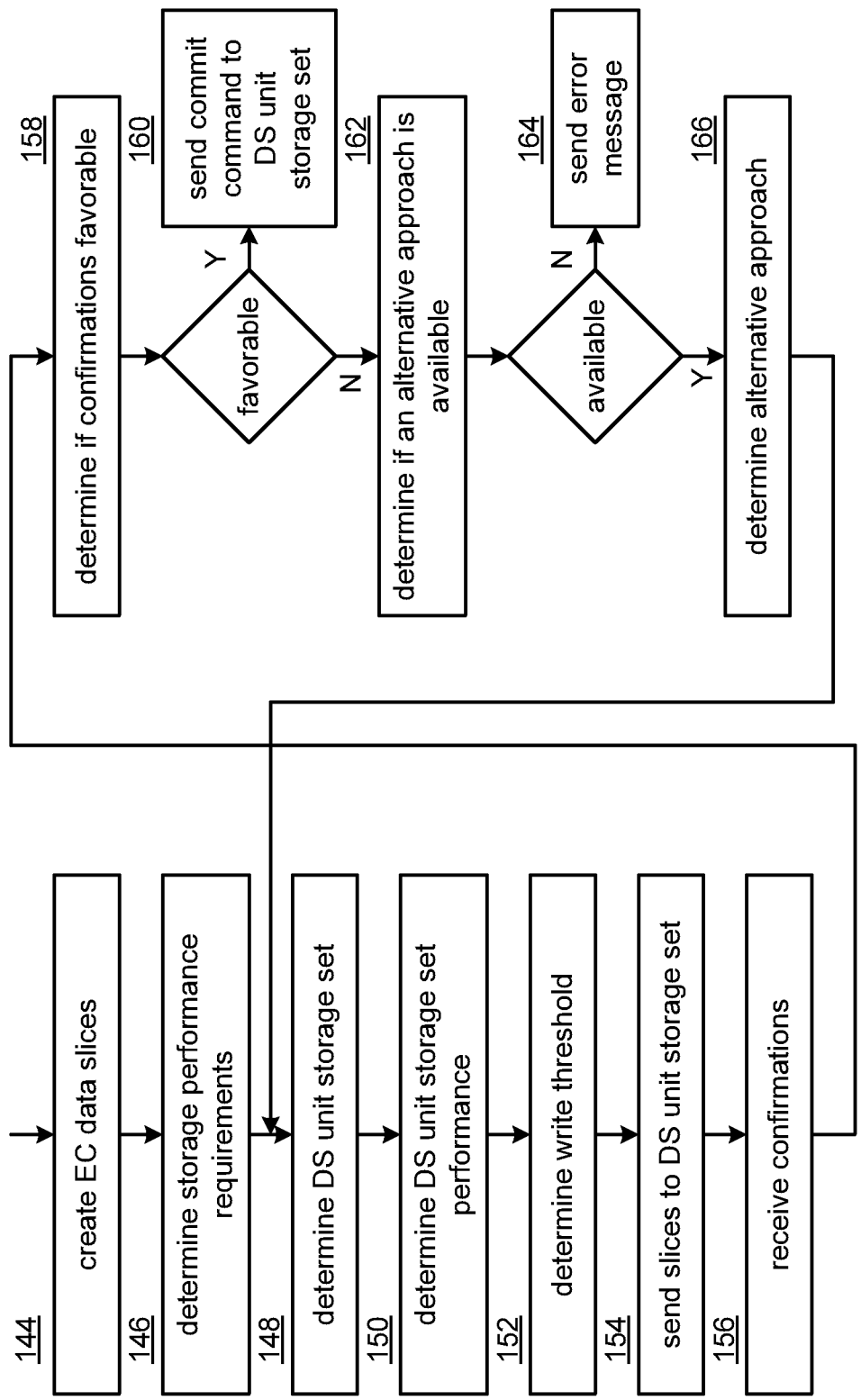
FIG. 8 is a flowchart illustrating an example of determining a write threshold in accordance with the invention.

FIG. 8 is a flowchart illustrating an example of determining a write threshold. The method begins at step 144 where a processing module creates error coded data slices in accordance with an error coded dispersal storage function. For example, the processing module of a DS processing unit receives a data object to store, segments the data object into a plurality of data segments, and encodes each data segment to produce a set of encoded data slices thereby yielding a plurality of sets of encoded data slices for the data object.

The method continues at step 146 where the processing module determines storage requirements based on one or more of a vault lookup, a user identity, a data type, a priority indicator, an availability indicator, a security indicator, a performance indicator, and an estimated frequency of retrieval indicator. Note that each of the storage requirements includes one or more of an availability requirement, a reliability requirement, a requirements preference indicator, and a write threshold enforcement indicator. For example, the processing module determines the availability requirement indicates "more availability" and the reliability requirement indicates "less reliability" when the performance indicator and user availability indicator indicate fast write sequences are of a higher priority and the user reliability indicator indicates that frequent reliable retrieval sequences are of a lower priority.

The method continues at step 148 where the processing module determines a plurality of DS units of a DS unit storage set (e.g., the set of DS units to store "n" pillars of slices for a vault) based on one or more of a vault lookup, a command, and a virtual DSN address to physical location table lookup. At step 150, the processing module determines an estimated performance based on one or more of a history of receiving acknowledgments, a history of availability, a history of reliability, a history of access latency, a history of access bandwidth, a vault lookup, and a real-time measurement. Note that the estimated performance includes at least one of an estimated probability of receiving the acknowledgments, estimated availability, estimated reliability, estimated access latency, and estimated access bandwidth.

The method continues at step 152 where the processing module determines the write threshold (e.g., a level of dispersed storage (DS) units required to acknowledge a DS write request) based on the storage requirements and the estimated performance. For example, the processing module selects the write threshold to a first range of values between a read threshold and a slicing pillar width for a first storage preference. As a more specific example, when the first storage preference corresponds to a retrieval reliability preference over write availability, the write threshold is determined to be closer to the slicing pillar width than the read threshold.

In another example, the processing module selects the write threshold to a second range of values between the read threshold and the slicing pillar width for a second storage preference. As a more specific example, when the second storage preference corresponds to the write availability preference over the retrieval reliability, the write threshold is determined to be closer to the read threshold than the slicing pillar width. In another example, the processing module selects the write threshold to a third range of values between the read threshold and the slicing pillar width for a third storage preference. As a more specific example, when the third storage preference corresponds to the write availability preference being comparable to the retrieval reliability, the write threshold is determined to be approximately midway between the read threshold and the slicing pillar width.

The method continues at step 154 where the processing module sends a plurality of dispersed storage (DS) write commands to the plurality of dispersed storage (DS) units for storing the plurality of encoded data slices. When a DS unit receives a corresponding one of the DS write commands (and an encoded data slice of a set of encoded data slices), it sends an acknowledgment to the processing module. At step 156, the processing module receives the acknowledgements from at least some of the plurality of DS units to produce received acknowledgements.

At the expiration of a time period (e.g., a few milliseconds to a few seconds) the method continues at step 158 where the processing module determines whether a number of received acknowledgements compares favorably to the write threshold. For example, the processing module determines that the number of received acknowledgments compares favorably to the write threshold when the number of received acknowledgments is equal to or greater than the write threshold. The method continues to step 160 the processing module determines that the comparison is favorable. At step 160, the processing module updates a history of receiving the acknowledgments, sends a commit command to the plurality of DS units, receives a second number of commit acknowledgment messages, and sends a finalize command to the plurality of DS units. The method branches to step 162 when the processing module determines that the comparison is not favorable.

At step 162, the processing module determines whether an alternative approach is available based on one or more of a write threshold enforcement indicator, the write threshold, an unresponsive DS unit of the current DS unit storage set, how many DS unit storage sets may have been tried, the time that has elapsed in attempting to store the encoded data slices, the storage requirements, and the estimated performance. For example, the processing module determines that an alternative approach is not available when the write threshold enforcement indicator is active. In another example, the processing module determines that an alternative approach is not available when five different sets of DS unit storage have been tried unsuccessfully and the write threshold is equal to the read threshold.

When an alternative approach is not available, the method continues at step 164 where the processing module sends an error message. Alternatively, or in addition to, the processing module may identify DS units of the plurality of DS units that did not provide an acknowledgment (i.e., uncommitted DS units) and re-send DS write commands to the uncommitted DS units until the number of received acknowledgements compares favorably to the write threshold.

When an alternative approach is available, the method continues at step 166 where the processing module determines an alternative approach based on one or more of the write threshold enforcement indicator, the write threshold, DS units of the current DS unit storage set, how many DS unit storage sets may have been tried, the time that has elapsed in attempting to store the slices, the storage performance requirements, and the DS unit estimated performance. The alternative approach includes changing the write threshold and/or changing at least one of the plurality of DS units.

When the write threshold is to be changed, the processing module determines second storage requirements determines second estimated performance, and determines a changed write threshold based on the second storage requirements and second estimated performance. For example, the processing module determines that the alternative approach is to lower the write threshold by 1 when the write threshold was still greater than the read threshold and the DS unit storage set estimated performance favorably compares to the storage requirements. In another example, the processing module determines that the alternative approach is to utilize a new DS unit storage set when the write threshold is already close to the read threshold and the current DS unit storage set estimated performance does not compare favorably with the storage requirements. The method branches back to step 148 to execute another loop until a favorable number of acknowledgments have been received.

In another example of determining a write threshold, the processing module determines storage requirements based on one or more of a vault lookup, a user identity, a data type, a priority indicator, an availability indicator, a security indicator, a performance indicator, and an estimated frequency of retrieval indicator. Note that each of the storage requirements includes one or more of an availability requirement, a reliability requirement, a requirements preference indicator, and a write threshold enforcement indicator. The method continues where the processing module selects a write threshold to correspond to a slicing pillar width when the storage requirements indicate retrieval reliability preference over write availability, wherein the write threshold indicates a level of dispersed storage (DS) units required to acknowledge a DS write request. Alternatively, the processing module selects the write threshold to correspond to a read threshold when the storage requirements indicate the write availability preference over the retrieval reliability. Alternatively, the processing module selects the write threshold to be between the slicing pillar width and the read threshold when the storage requirements indicate that the write availability preference is comparable to the retrieval reliability.

This example continues where the processing module determines estimated performance based on one or more of a history of receiving acknowledgments, a history of availability, a history of reliability, a history of access latency, a history of access bandwidth, a vault lookup, and a real-time measurement. Note that the estimated performance includes at least one of estimated probability of receiving the acknowledgments, estimated availability, estimated reliability, estimated access latency, and estimated access bandwidth. The method continues where the processing module selects a plurality of dispersed storage (DS) units based on the estimated performance.

FIG. 9 is a flowchart illustrating an example of disguising a revision number. The method begins at step 168 where a DS processing receives a data object (e.g., from a user device or other source). In addition, the DS processing may receive one or more of a data object name, a revision number request, a data object size indicator, a user ID, a data type, a security indicator, a performance indicator, a priority indicator, and a reliability indicator.

The method continues at step 170 where the DS processing determines a revision number based on one or more of a vault lookup (e.g., find the last revision number for the same data object name) the data object name, the revision number request, the data object size indicator, the user ID, the data type, the security indicator, the performance indicator, the priority indicator, and the reliability indicator. The method continues at step 172 where the DS processing determines a disguised revision number based on the revision number. For example, the DS processing calculates a hash of the revision number to produce the disguised revision number. In another example, the DS processing performs a transformation on the revision number to produce the disguised revision number, wherein the transformation includes one or more of encryption, error coding, compression, and hash based message authentication code (HMAC).

The method continues at step 174 where the DS processing appends the disguised revision number to the data object to produce an appended data object. At step 176, the DS processing segments the appended data object produce a plurality of data segments. The DS processing encodes each of the plurality of data segments in accordance with an error coding dispersed storage function to produce a plurality of sets of encoded data slices. At step 178, the DS processing sends the plurality of sets of encoded data slices to a dispersed storage network memory for storage therein. Alternatively, the DS processing segments the data object to produce the plurality of data segments. The DS processing encodes each of the plurality of data segments in accordance with the error coding dispersal storage function to produce the plurality of sets of encoded data slices. The DS processing appends the disguised revision number to the plurality of sets of encoded data slices to produce appended data slices. The DS processing sends the appended data slices to the dispersed storage network memory for storage therein.

Note that a similar method may be utilized to disguise timestamps associated with one or more of reception of the data object, creation of data segments, creation of slices, and storing of slices. Disguising of revision numbers and/or timestamps may provide a system performance improvement to hide DSN system usage patterns.

FIG. 10 is a flowchart illustrating an example of retrieving data utilizing a disguised revision number. The method begins at step 180 where a DS processing receives a retrieve data object request from a requester (e.g., from a user device or other source). In addition, the DS processing may receive one or more of a data object name, a revision number request, a data object size indicator, a user ID, and a data type with the received retrieve data object request.

At step 182, the DS processing determines a desired revision number based on one or more of a vault lookup (e.g., find the last revision number for the same data object name), the data object name, the revision number request, the data object size indicator, the user ID, and the data type. At step 184, the DS processing determines a disguised revision number of the desired revision number. For example, the DS processing calculates a hash of the desired revision number to produce the disguised revision number. In another example, the DS processing performs a transformation on the desired revision number to produce the disguised revision number where the transformation includes one or more of encryption, error coding, compression, and/or hash based message authentication code (HMAC).

At step 186, the DS processing sends a retrieval request to a dispersed storage network (DSN) memory. The DS processing receives encoded data slices and a received disguised revision number. At step 188, the DS processing verifies the received disguised revision number by comparing the received disguised revision number two the desired revision number. The DS processing verifies the received disguised revision number when the received disguised revision number and the desired disguised revision number are substantially the same. The method branches to step 192 when the DS processing verifies the received disguised revision. The method continues step 190 when the DS processing does not verify the received disguised revision. At step 190, the DS processing targets slices from another revision in the DSN memory and the method branches back to step 186. At step 192, the DS processing recreates the data object from the received encoded data slices in accordance with an error coding dispersal storage function. At step 194, the DS processing sends the data object to the requester.

Note that a similar method may be utilized to retrieve disguised timestamps associated with one or more of reception of the data object, creation of data segments, creation of slices, and storing of encoded data slices. Disguising of revision numbers and/or timestamps may provide a system performance improvement to hide DSN system usage patterns.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a dispersed storage processing module, the method comprises:
    determining a write threshold based on at least one of:
        selecting a slicing pillar width as the write threshold when storage requirements indicate retrieval reliability preference over write availability;
        selecting a read threshold as the write threshold when the storage requirements indicate the write availability preference over the retrieval reliability; and
        selecting the write threshold to be between the slicing pillar width and the read threshold when the storage requirements indicate that the write availability preference is comparable to the retrieval reliability;
    sending a plurality of dispersed storage (DS) write commands to plurality of dispersed storage (DS) units for storing a plurality of encoded data slices;
    receiving, within a time period, acknowledgements from at least some of the plurality of DS units to produce received acknowledgements;
    determining whether a number of received acknowledgements compares favorably to the write threshold; and
    when the number of received acknowledgements does not compare favorably to the write threshold, changing at least one of the write threshold and at least one of the plurality of DS units.

2. The method of claim 1 further comprises:
when the write threshold is to be changed:
- determining second storage requirements;
- determining a second retrieval reliability preference and a second write availability; and
- determining a changed write threshold based on the second storage requirements, the second retrieval reliability preference and the second write availability.

3. The method of claim 2 further comprises:
determining the storage requirements or the second storage requirements based on one or more of: a vault lookup, a user identity, a data type, a priority indicator, an availability indicator, a security indicator, a performance indicator, and an estimated frequency of retrieval indicator, wherein each of the storage requirements and the second storage requirements includes one or more of an availability requirement, a reliability requirement, a requirements preference indicator, and a write threshold enforcement indicator.

4. The method of claim 2 further comprises:
determining at least one of the retrieval reliability preference, the write availability, the second retrieval reliability preference, and the second write availability based on one or more of: a history of receiving the acknowledgments, a history of availability, a history of reliability, a history of access latency, a history of access bandwidth, a vault lookup, and a real-time measurement.

5. The method of claim 1 further comprises:
when the number of received acknowledgments compares favorably to the write threshold:
- updating a history of receiving the acknowledgments;
- sending a commit command to the plurality of DS units;
- receiving a second number of commit acknowledgment messages; and
- sending a finalize command to the plurality of DS units.

6. The method of claim 1 further comprises:
when the number of received acknowledgments compares unfavorably to the write threshold, determining whether a write threshold enforcement indicator is active;
when the threshold enforcement indicator is active:
- sending an error message;
- identifying DS units of the plurality of DS units that did not provide an acknowledgment to produce uncommitted DS units; and
- re-sending some of the plurality of DS write commands to the uncommitted DS units until the number of received acknowledgements compares favorably to the write threshold.

7. A method comprises:
selecting a write threshold to a first range of values between a read threshold and a slicing pillar width for a first storage preference, wherein the write threshold indicates a level of dispersed storage (DS) units required to acknowledge a DS write request;
selecting the write threshold to a second range of values between the read threshold and the slicing pillar width for a second storage preference
selecting the write threshold to a third range of values between the read threshold and the slicing pillar width for a third storage preference, wherein:
- the first storage preference corresponding to a retrieval reliability preference over write availability;
- the second storage preference corresponding to the write availability preference over the retrieval reliability; and
- the third storage preference corresponding to the write availability preference is comparable to the retrieval reliability.

8. The method of claim 7 further comprises:
determining the first storage preference, the second storage preference, or the third storage preference based on one or more of: a history of receiving acknowledgments, a history of availability, a history of reliability, a history of access latency, a history of access bandwidth, a vault lookup, estimated performance, and a real-time measurement, wherein the estimated performance includes at least one of estimated probability of receiving the acknowledgments, estimated availability, estimated reliability, estimated access latency, and estimated access bandwidth; and
selecting a plurality of DS units based on the first storage preference, the second storage preference, or the third storage preference.

9. A computer comprises:
an interface; and
a processing module operable to:
- determine a write threshold based on at least one of:
  - selecting a slicing pillar width as the write threshold when storage requirements indicate retrieval reliability preference over write availability;
  - selecting a read threshold as the write threshold when the storage requirements indicate the write availability preference over the retrieval reliability; and
  - selecting the write threshold to be between the slicing pillar width and the read threshold when the storage requirements indicate that the write availability preference is comparable to the retrieval reliability;
- send, via the interface, a plurality of dispersed storage (DS) write commands to plurality of dispersed storage (DS) units for storing a plurality of encoded data slices;
- receive, via the interface, within a time period, acknowledgements from at least some of the plurality of DS units to produce received acknowledgements;
- determine whether a number of received acknowledgements compares favorably to a write threshold; and
- change at least one of the write threshold and at least one of the plurality of DS units when the number of received acknowledgements does not compare favorably to the write threshold.

10. The computer of claim 9, wherein the processing module further functions to:
when the write threshold is to be changed:
- determine second storage requirements;
- determine a second retrieval reliability preference and a second write availability; and
- determine a changed write threshold based on the second storage requirements, the second retrieval reliability preference and the second write availability.

11. The computer of claim 10, wherein the processing module further functions to:
determine the storage requirements or the second storage requirements based on one or more of: a vault lookup, a user identity, a data type, a priority indicator, an availability indicator, a security indicator, a performance indicator, and an estimated frequency of retrieval indicator, wherein each of the storage requirements and the second storage requirements includes one or more of an availability requirement, a reliability requirement, a requirements preference indicator, and a write threshold enforcement indicator.

12. The computer of claim 10, wherein the processing module further functions to:
   determine at least one of the retrieval reliability preference, the write availability, the second retrieval reliability preference, and the second write availability based on one or more of: a history of receiving the acknowledgments, a history of availability, a history of reliability, a history of access latency, a history of access bandwidth, a vault lookup, and a real-time measurement.

13. The computer of claim 9, wherein the processing module further functions to:
   when the number of received acknowledgments compares favorably to the write threshold:
      update a history of receiving the acknowledgments;
      send, via the interface, a commit command to the plurality of DS units;
      receive, via the interface, a second number of commit acknowledgment messages; and
      send, via the interface, a finalize command to the plurality of DS units.

14. The computer of claim 9, wherein the processing module further functions to:
   when the number of received acknowledgments compares unfavorably to the write threshold, determine whether a write threshold enforcement indicator is active;
   when the threshold enforcement indicator is active:
      send, via the interface, an error message;
      identify DS units of the plurality of DS units that did not provide an acknowledgment to produce uncommitted DS units; and
      re-send, via the interface, some of the plurality of DS write commands to the uncommitted DS units until the number of received acknowledgements compares favorably to the write threshold.

15. A computer comprises:
   an interface; and
   a processing module operable to:
      select a write threshold to a first range of values between a read threshold and a slicing pillar width for a first storage preference, wherein the write threshold indicates a level of dispersed storage (DS) units required to acknowledge a DS write request; and
      select the write threshold to a second range of values between the read threshold and the slicing pillar width for a second storage preference
      select the write threshold to a third range of values between the read threshold and the slicing pillar width for a third storage preference, wherein:
         the first storage preference corresponding to a retrieval reliability preference over write availability;
         the second storage preference corresponding to the write availability preference over the retrieval reliability; and
         the third storage preference corresponding to the write availability preference is comparable to the retrieval reliability.

16. The computer of claim 15, wherein the processing module further functions to:
   determine the first storage preference, the second storage preference, or the third storage preference based on one or more of: a history of receiving acknowledgments via the interface, a history of availability, a history of reliability, a history of access latency, a history of access bandwidth, a vault lookup, estimated performance, and a real-time measurement, wherein the estimated performance includes at least one of estimated probability of receiving the acknowledgments via the interface, estimated availability, estimated reliability, estimated access latency, and estimated access bandwidth; and
   selecting a plurality of DS units based on the first storage preference, the second storage preference, or the third storage preference.

* * * * *